(12) United States Patent
Wang et al.

(10) Patent No.: US 8,434,949 B2
(45) Date of Patent: May 7, 2013

(54) OPTICAL FIBER CONNECTOR

(75) Inventors: Chun-Hsiung Wang, Tu-Cheng (TW);
Wen-Yi Hsieh, Tu-Cheng (TW);
Yen-Chih Chang, Tu-Cheng (TW);
Ming-Lun Szu, Tu-Cheng (TW);
Chien-Hung Lee, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 288 days.

(21) Appl. No.: 12/892,952

(22) Filed: Sep. 29, 2010

(65) Prior Publication Data

US 2011/0075975 A1    Mar. 31, 2011

(51) Int. Cl.
*G02B 6/38* (2006.01)
(52) U.S. Cl.
USPC .................................. 385/74; 385/53; 385/55
(58) Field of Classification Search .................... 385/74
See application file for complete search history.

(56) References Cited

U.S. PATENT DOCUMENTS

| | | | | |
|---|---|---|---|---|
| 4,534,616 | A | * | 8/1985 | Bowen et al. .................... 385/79 |
| 5,241,612 | A | * | 8/1993 | Iwama ............................. 385/74 |
| 5,519,799 | A | * | 5/1996 | Murakami et al. .............. 385/78 |
| 7,985,026 | B1 | * | 7/2011 | Lin et al. ......................... 385/71 |
| 8,100,588 | B2 | * | 1/2012 | Wong et al. ..................... 385/53 |
| 2004/0170361 | A1 | * | 9/2004 | Grabbe ........................... 385/78 |
| 2008/0175547 | A1 | * | 7/2008 | Wang et al. ..................... 385/92 |
| 2011/0237110 | A1 | * | 9/2011 | Montena ....................... 439/349 |

* cited by examiner

*Primary Examiner* — Bumsuk Won
*Assistant Examiner* — Ryan Crockett
(74) *Attorney, Agent, or Firm* — Wei Te Chung; Ming Chieh Chang

(57) ABSTRACT

An optical fiber connector includes a pair of optical fibers and a seat defining a pair of lenses at a front edge thereof and passageways aligned with the lenses respectively and receiving the optical fibers. The seat defines a pair of first apertures at a first surface thereof communicating with the passageways, and a pair of second aperture at a second surface thereof opposite to the first surface communicating with the passageways. Rear insides of the first apertures are aligned with front insides of the second apertures.

16 Claims, 4 Drawing Sheets

OPTICAL FIBER CONNECTOR

BACKGROUND OF THE INVENTION

1. Field of the Invention

The present invention relates to an optical fiber connector with integral lens to refract lights.

2. Description of Related Art

U.S. Pat. No. 4,534,616 discloses an optical fiber connector, which includes an insulating seat, lenses integrally formed at the front end of the seat and optical fibers retained in the seat and aligned with the optical center lens. As known from the patent drawings, the optical fibers are inserted in the fine slots defined in the seat from the rear end of the seat. The fine slots generally are formed by stripping fine moulds during an injection molding process. In practice this molding methods might result in deformation or deviation of the fine slots, thereby the optical fibers can not align with the lenses.

SUMMARY OF THE INVENTION

An object of the present invention is to provide an optical fiber connector ensuring a good performance of fine slots receiving optical fibers.

In order to achieve above-mentioned object, an optical fiber connector comprises a pair of optical fibers and a seat defining a pair of lenses at a front edge thereof and passageways aligned with the lenses respectively and receiving the optical fibers. The seat defines a pair of first apertures at a first surface thereof communicating with the passageways, and a pair of second aperture at a second surface thereof opposite to the first surface communicating with the passageways. Rear insides of the first apertures are aligned with front insides of the second apertures.

Other objects, advantages and novel features of the present invention will become more apparent from the following detailed description of the present embodiment when taken in conjunction with the accompanying drawings.

DETAILED DESCRIPTION OF THE INVENTION

Figure 1:
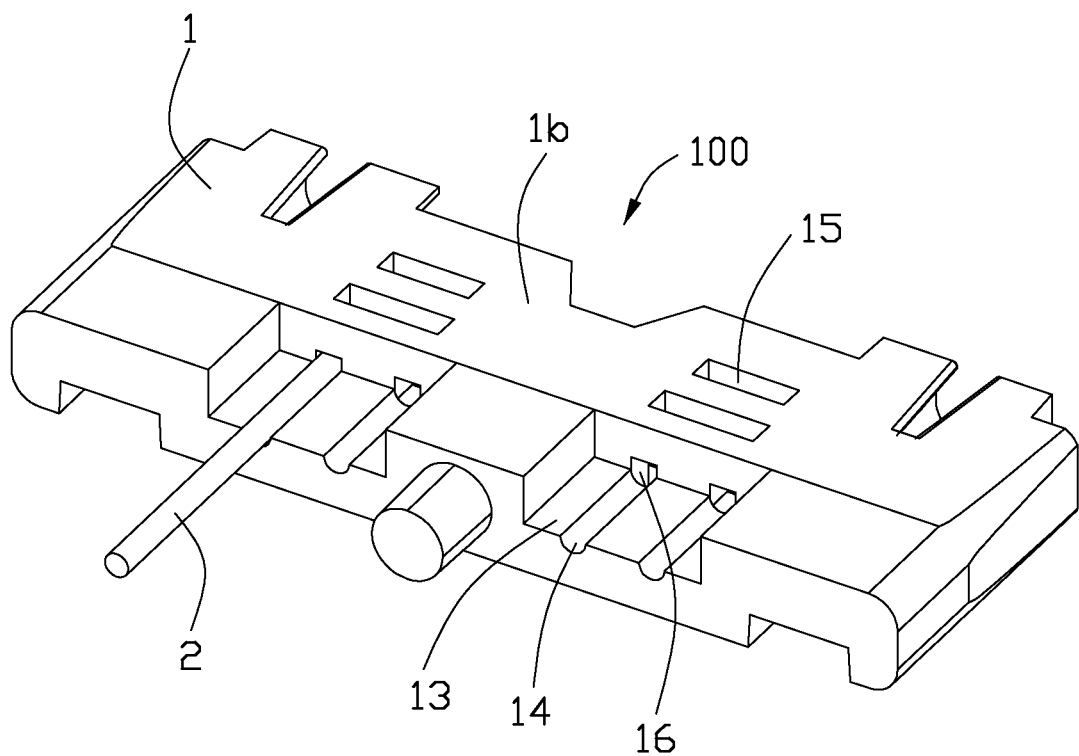
FIG. 1 is a perspective view of an optical fiber connector in accordance with the present invention.

Reference will now be made to the drawing figures to describe the preferred embodiment of the present invention in detail.

Figure 2:
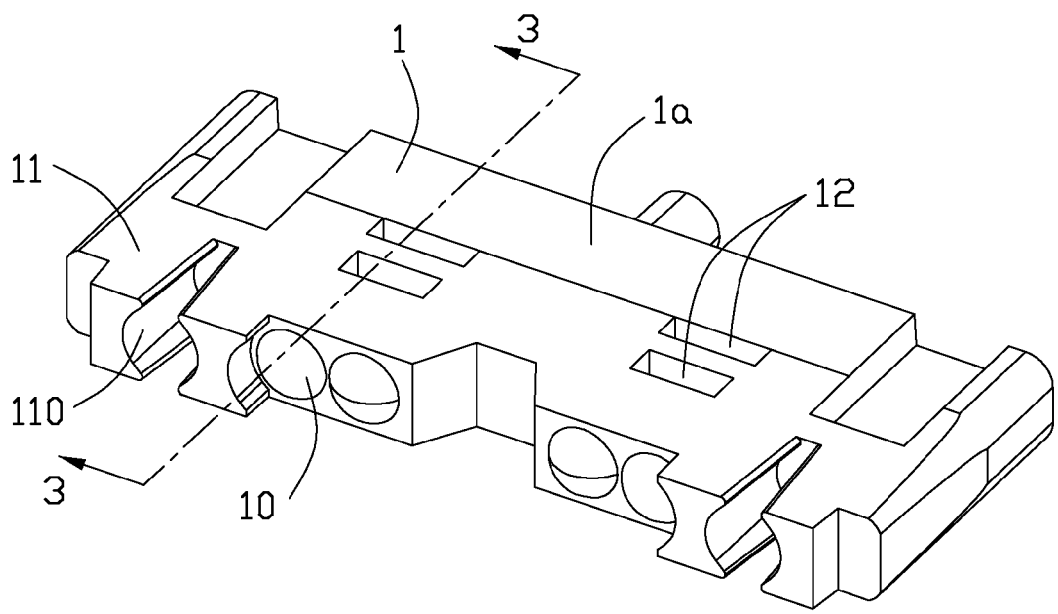
FIG. 2 is a perspective view of the optical fiber connector from another view.

Referring to FIG. 1, an optical fiber connector 100 in accordance with the invention includes an insulating seat 1 made from injection mould plastic, which can be transparent materials or not, and optical fibers 2 inserted and retained in the seat. In this embodiment, two pairs of optical fibers are provided, only one is illustrated in FIG. 1. Combination with FIG. 2, the seat in the shape of rectangle defines two pairs of truncated non-spherical lenses 10 from a front edge thereof and two guiding portions 11 at the outsides of the pairs of the lenses 10. The guiding portions 11 define guiding holes 110 penetrating through a front edge thereof, which are in the shape of tapper and opening through a first and second surface 1a, 1b of the seat 1. The seat 1 defines two pairs of first apertures 12 at the substantially middle location on the first surface 1a thereof, the two first apertures of each pair are parallel arranged along the front to rear direction or the inserting direction and aligned with one pair of the lenses 10. The second surface 1b defines recesses 13 at a rear portion thereof to receive the optical fibers 2 in corresponding grooves 14 in the bottom of the recesses 13. The grooves 14 extend forwards to form corresponding passageways 16 in the seat to receive the front ends of the optical fibers 2. The second surface 1b of the seat also defines two pairs of second apertures 15 at the substantially middle location thereof, two second apertures of each pair are parallel arranged along the front to rear direction or the inserting direction and aligned with one pair of the lenses 10. The first apertures are located at a same side to the recess.

Figure 3:
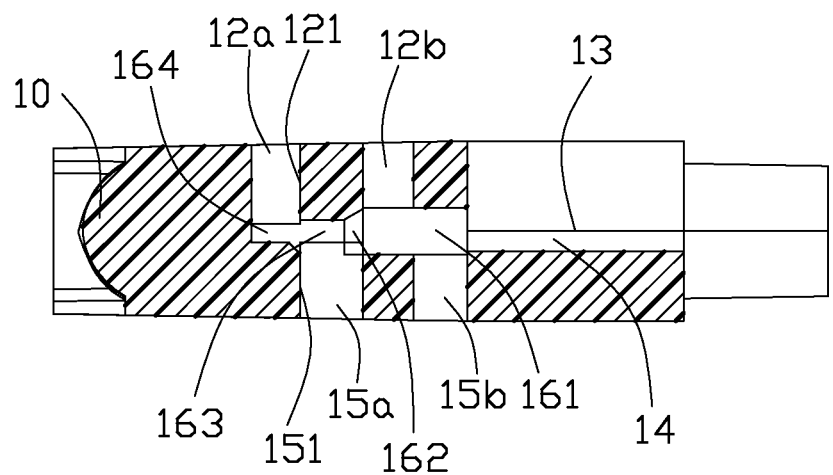
FIG. 3 is a cross sectional view of the optical fiber connector taken along lines 3-3.
Figure 4:
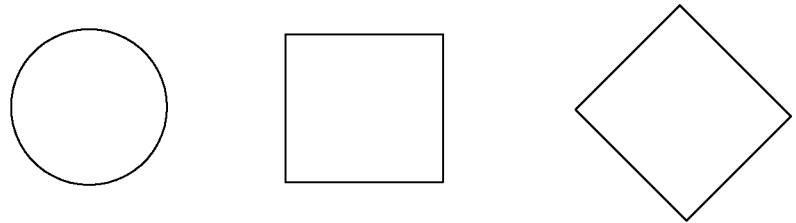
FIG. 4 is cross-sectional schematic views of the grooves.

Referring to FIG. 3, the passageway 16 includes a first section 161 near to the groove 14, a second section 162, a third section 163 and a fourth section 164 ranked from rear to front. The first section 161 is larger than the groove 15 in dimension, the third and the fourth sections 163, 164 are similar to each other in dimension. The second section 162 is in a shape of chamber to transition the larger first section 161 and the smaller third section 163. The first apertures are located forwards in relative to the second apertures. The first apertures 12a adjacent to the lens 10 communicate downwards with the fourth section 164 and the first apertures 12b adjacent to the near of the seat communicate downwards with the front portion of first section. The second apertures 15a adjacent to the lens communicate upwards with the second section and the third section and the second aperture 15b near to the rear of the seat communicate upwards with the rear portion of the first section. The first and the second apertures are offset in the upper to lower direction in a condition that the rear inside 121 of the first aperture are aligned with the front inside 151 of the second apertures. The first and second apertures can be formed in multiple shapes, as cross sections shown in FIG. 4.

The passageways 16 are formed by an upper mould and a lower mould in the injection mould process. The apertures 12, 15 are used to strip the moulds. The third and fourth section of the passageways is fine to receive the front end of the optical fiber. In this invention, the passageways can avoid deformation or deviation which might be effective by the flow of the plastic in the injection mould process.

However, the disclosure is illustrative only, changes may be made in detail, especially in matter of shape, size, and arrangement of parts within the principles of the invention.

What is claimed is:

1. An optical fiber connector comprising:
   a pair of optical fibers; and
   a unitary seat defining a pair of lenses at a front edge thereof and passageways aligned with the lenses respectively and receiving the optical fibers;
   the seat defining a pair of first apertures at a first external surface thereof communicating with the passageways, and a pair of second aperture at a second external surface thereof opposite to the first external surface communicating with the passageways;
   wherein rear insides of the first apertures are aligned with front insides of the second apertures so as to strip a lower mold and an upper mold after the passageways are formed by the lower and upper molds.

2. The optical fiber connector as described in claim 1, wherein each passageway includes a first section, a second section, a third section and a fourth section ranked from rear to front, one of the first apertures is aligned with the fourth section and one of the second apertures is aligned with the third and second section of the passageway, the others of the first aperture and the second aperture are aligned with the first section of the passageway.

3. The optical fiber connector as described in claim 2, wherein the third section and the fourth section are smaller than the first section in dimension.

4. The optical fiber connector as described in claim 3, wherein the second section is in a shape of chamber to transition the first section and the third section.

5. The optical fiber connector as described in claim 4, wherein front ends of the optical fibers are received in the fourth and the third sections of the passageways.

6. The optical fiber connector as described in claim 1, wherein the seat defines recesses at a rear end thereof and grooves at a bottom of the recesses, the grooves are aligned with corresponding passageways to receive the optical fibers.

7. The optical fiber connector as described in claim 1, wherein the seat defines a pair of guiding portions at outsides of the lenses, the guiding portions define tapper guiding holes penetrating through a front edge thereof.

8. The optical fiber connector as described in claim 7, wherein the guiding holes open in the first and the second external surfaces.

9. The optical fiber connector as described in claim 6, wherein the first apertures are located at a same side to the recess, the first apertures are located forward in relative to corresponding grooves.

10. An optical fiber connector comprising:
a unitary insulative seat defining opposite first and second external surfaces and an optic fiber receiving passage extending along an axial direction thereof and located between the opposite first and second external surfaces in a distant parallel relation, said passage defining first and second halves, in a view along said axial direction, respectively communicatively facing toward said opposite first and second external surfaces of the seat; and
a plurality of first apertures spaced from one another along the axial direction and extending from the first external surface and reach the passage to form the first half, and
a plurality of spaced second apertures spaced from one another along the axial direction and extending from the second external surface and reach the passage to form the second half,
wherein rear insides of the first apertures are aligned with front insides of the second apertures so as to strip a lower mold and an upper mold after the passage is formed by the lower and upper molds.

11. The optical fiber connector as claimed in claim 10, wherein said first apertures and said second apertures are alternately arranged with each other along the axial direction.

12. The optical fiber connector as claimed in claim 11, wherein said passage defines variant dimensions in an increasing manner in said axial direction.

13. An optical fiber connector comprising:
a unitary insulative seat defining optic fiber receiving passageways defining an axial direction thereof;
the seat defining first apertures communicating with the passageways from a first surface thereof and second apertures communicating with the passageways from a second surface opposite to the first surface;
wherein each of the first apertures and the second apertures is mostly unoccupied after the optical fiber is received in the receiving passageway, and
wherein rear insides of the first apertures are aligned with front insides of the second apertures.

14. The optical fiber connector as claimed in claim 10, wherein said first apertures and said second apertures extend in a direction perpendicular to said axial direction.

15. The optical fiber connector as claimed in claim 14, wherein an inner end of one of said first apertures and said second apertures defines a structure to vary a diameter of a portion of said passageway corresponding to said inner end.

16. The optical fiber connector as clamed in claim 15, wherein said structure is a chamfer.

* * * * *